(12) United States Patent
Guthrie et al.

(10) Patent No.: US 8,557,708 B2
(45) Date of Patent: Oct. 15, 2013

(54) METHODS FOR FABRICATING A MAGNETIC HEAD READER USING A CHEMICAL MECHANICAL POLISHING (CMP) PROCESS FOR SENSOR STRIPE HEIGHT PATTERNING

(75) Inventors: Hung-Chin Guthrie, Saratoga, CA (US); Ying Hong, Morgan Hill, CA (US); Ming Jiang, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 1512 days.

(21) Appl. No.: 11/743,404

(22) Filed: May 2, 2007

(65) Prior Publication Data
US 2008/0274623 A1 Nov. 6, 2008

(51) Int. Cl.
*H01L 21/302* (2006.01)
*H01L 21/461* (2006.01)

(52) U.S. Cl.
USPC .................. 438/712; 438/3; 438/692

(58) Field of Classification Search
USPC .......... 438/712, 3, 692; 360/317, 322; 216/22
See application file for complete search history.

(56) References Cited

U.S. PATENT DOCUMENTS

| | | | |
|---|---|---|---|
| 6,327,107 B1 | 12/2001 | Komuro et al. | |
| 6,669,983 B2 | 12/2003 | Kagami et al. | |
| 6,787,369 B2 | 9/2004 | Ishii et al. | |
| 6,858,909 B2 | 2/2005 | Cyrille et al. | |
| 6,876,525 B2 | 4/2005 | Lin et al. | |
| 6,933,155 B2 | 8/2005 | Albert et al. | |
| 6,954,344 B2 | 10/2005 | Cyrille et al. | |
| 6,995,960 B2 | 2/2006 | Seyama et al. | |
| 7,008,550 B2 | 3/2006 | Li et al. | |
| 7,037,847 B2 | 5/2006 | Le et al. | |
| 7,038,890 B2 | 5/2006 | Pinarbasi | |
| 2003/0035254 A1 | 2/2003 | Furukawa et al. | |
| 2004/0000845 A1 | 1/2004 | Kagami et al. | |
| 2004/0057163 A1* | 3/2004 | Lin | 360/322 |
| 2004/0095691 A1* | 5/2004 | Lin et al. | 360/324.1 |
| 2005/0067372 A1* | 3/2005 | Li et al. | 216/22 |
| 2005/0067374 A1 | 3/2005 | Baer et al. | |
| 2005/0180061 A1 | 8/2005 | Ding et al. | |
| 2006/0000078 A1 | 1/2006 | Pinarbasi | |
| 2006/0094129 A1 | 5/2006 | Pinarbasi | |

FOREIGN PATENT DOCUMENTS

JP 2003317213 11/2003

* cited by examiner

*Primary Examiner* — Nadine G Norton
*Assistant Examiner* — Mahmoud Dahimene
(74) *Attorney, Agent, or Firm* — Duft, Bornsen, Fettig LLP (57) ABSTRACT

Methods for fabricating TMR and CPP GMR magnetic heads using a chemical mechanical polishing (CMP) process with a patterned CMP conductive protective layer for sensor stripe height patterning. The method comprises defining a stripe height of a read sensor of a magnetic head reader. The method further comprises refill depositing an insulator layer on the read sensor. The method further comprises performing a CMP process down to the conductive protective layer on the read sensor deposited while defining the read sensor to remove an overfill portion of the insulator layer above the conductive protective layer and to remove a sensor pattern masking structure on the conductive protective layer. As a result, the insulator layer is planarized and smooth with the read sensor, eliminating fencing and alumina bumps typically encountered in the insulator layer at the edge of the patterned sensor.

20 Claims, 11 Drawing Sheets

METHODS FOR FABRICATING A MAGNETIC HEAD READER USING A CHEMICAL MECHANICAL POLISHING (CMP) PROCESS FOR SENSOR STRIPE HEIGHT PATTERNING

BACKGROUND OF THE INVENTION

1. Field of the Invention

The invention is related to the field of magnetic recording head fabrication, and in particular, to improved methods of fabricating a read sensor which involve using a chemical mechanical polishing (CMP) process with a patterned conductive CMP protective layer for sensor stripe height patterning.

2. Statement of the Problem

Magnetic disk drive systems typically include a magnetic disk, a magnetic recording head having read and write elements, a suspension arm, and an actuator arm. As the magnetic disk is rotated, air adjacent to the disk surface moves with the disk. This allows the magnetic recording head (also referred to as a slider) to fly on an extremely thin cushion of air, generally referred to as an air bearing. When the magnetic recording head flies on the air bearing, the actuator arm swings the suspension arm to place the magnetic recording head over selected circular tracks on the rotating magnetic disk where signal fields are written to and read by the write and read elements, respectively. The write and read elements are connected to processing circuitry that operates according to a computer program to implement write and read functions.

The magnetic recording head is typically produced using thin-film deposition and patterning techniques. The magnetic head reader fabrication involves two separate patterning processes. One process defines the stripe height of the read sensor, while another process defines the track width of the read sensor. In particular, the several material layers which make up a read sensor for a magnetic reader are typically formed by depositing full film sensor layers of the required materials on a wafer substrate, depositing and patterning a masking layer over the sensor layers to form a mask structure, etching the exposed portion of the sensor layers around the mask structure, and then removing the mask structure.

The mask structure is removed using a CMP assisted lift-off process. CMP protective layers (also called CMP stop layers) are deposited between various layers of the fabricated structure to protect other layers, such as sensor layers and insulation during the CMP lift-off process. These protective layers are then removed using another etching process (e.g., reactive ion etching or ion milling).

Problems are encountered in the prior art process because alumina bumps or fencing may occur at edges of sensor after the stripe height definition process. This added topography may cause shield shorts and sensor shunt subsequent to the track width definition process because the insulator layer is not fabricated flat with the read sensor. It is evident from the above discussion that improved solutions are needed for fabricating magnetic readers using new processes.

SUMMARY OF THE SOLUTION

The invention solves the above and other related problems with improved methods for fabricating a magnetic reader using a CMP process with a patterned CMP conductive protective layer for sensor stripe height patterning. After a sensor is patterned and an insulator layer is deposited, the CMP process is used to planarize the insulator layer. The CMP process stops at the CMP conductive protective layer. The CMP conductive protective layer may be left in place as sensor cap of a read sensor of the magnetic reader. The invention eliminates the alumina bumps typically encountered by prior art stripe height definition processes using DLC protective layers. The invention also allows for the elimination of a second protective layer (e.g., a DLC layer) used in prior art stripe height definition processes.

A first exemplary embodiment comprises a method for fabricating magnetic readers. The method comprises defining a read sensor of a magnetic reader. The method further comprises depositing an insulator layer on the read sensor. The method further comprises performing a CMP process down to a conductive protective layer deposited while defining the read sensor to remove an overfill portion of the insulator layer above the conductive protective layer and to remove a sensor pattern mask structure above the conductive protective layer.

A second exemplary embodiment of the invention comprises a method for fabricating magnetic readers. The method comprises defining a stripe height of a read sensor of a magnetic reader. The read sensor has a field on side regions of the read sensor. During the stripe height definition process a conductive protective layer is formed above a top portion of the read sensor to protect the read sensor. The method further comprises depositing an insulator layer on the read sensor. The insulator layer is deposited in the field of the read sensor to a height above the conductive protective layer. The method further comprises performing a CMP process down to the conductive protective layer. The CMP process removes an overfill portion of the insulator layer above the conductive protective layer, planarizes the insulator layer with the conductive protective layer and removes a sensor pattern mask structure above the conductive protective layer. The method further comprises defining a track width of the read sensor. The method further comprises depositing a bi-layer photo resistive structure on the magnetic reader. The method further comprises milling the magnetic reader to remove material on side regions of the bi-layer photo resistive structure. The method further comprises depositing insulator material on side regions of the bi-layer photo resistive structure. The method further comprises performing a lift-off process to remove the bi-layer photo resistive structure. As a result, the insulator layer is planarized and flush with the read sensor, eliminating fencing typically encountered at the edges of the insulator layer.

A third exemplary embodiment is a method for fabricating magnetic readers. The method comprises depositing sensor layers. The method further comprises depositing a conductive protective layer on the sensor layers. The method further comprises depositing a masking layer on the conductive protective layer. The masking layer is etchable for definition of a mask structure. The method further comprises etching the conductive protective layer around the mask structure to remove a portion of the conductive protective layer. The method further comprises etching the sensor layers to define a stripe height of a read sensor of the magnetic reader. The method further comprises depositing an insulator layer on the read sensor. The method further comprises performing a CMP process down to the conductive protective layer.

The invention may include other exemplary embodiments described below.

DESCRIPTION OF THE DRAWINGS

The same reference number represents the same element or similar type of element on all drawings.

DETAILED DESCRIPTION OF THE INVENTION

Figure 1:
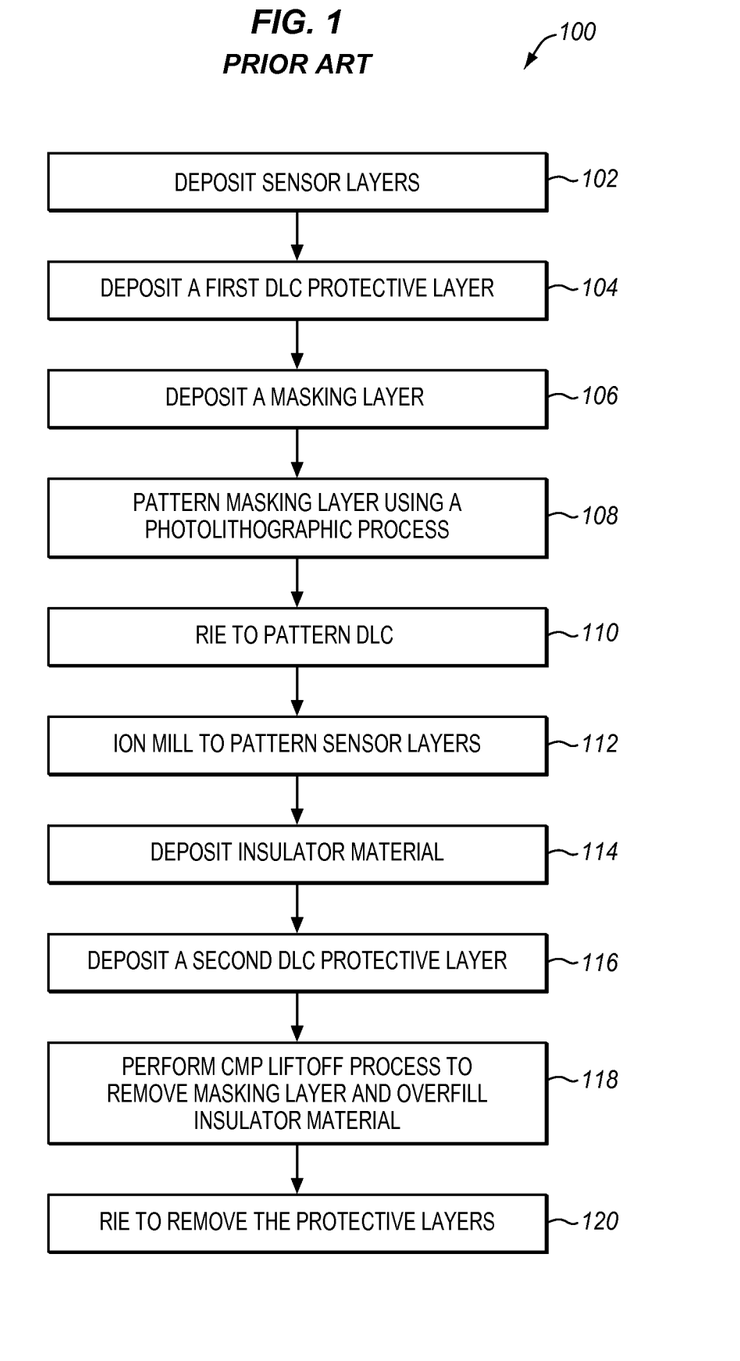
FIG. 1 is a flow chart illustrating a prior art method for fabricating a magnetic reader, and in particular for defining the stripe height of a read sensor of the magnetic reader.

FIG. 1 is a flowchart illustrating a prior art process used for defining the stripe height of a read sensor of a magnetic reader. FIGS. 2-10 are cross-sectional views illustrating the layers of the magnetic reader during the stripe height fabrication process illustrated in FIG. 1.

Figure 2:
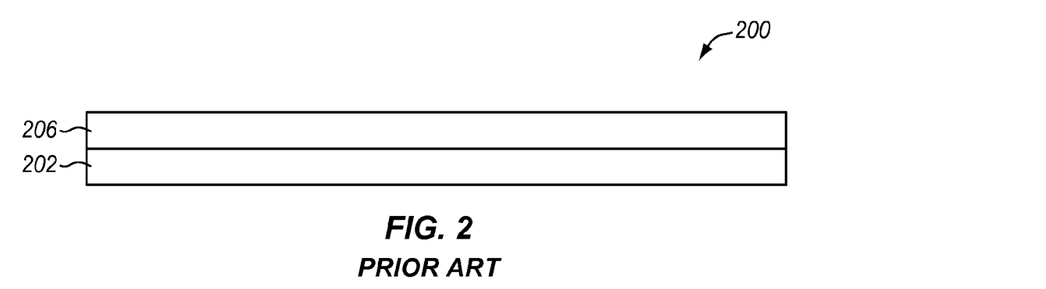
FIGS. 2-10 are cross-sectional views of a magnetic reader formed according to the method of FIG. 1.
Figure 3:
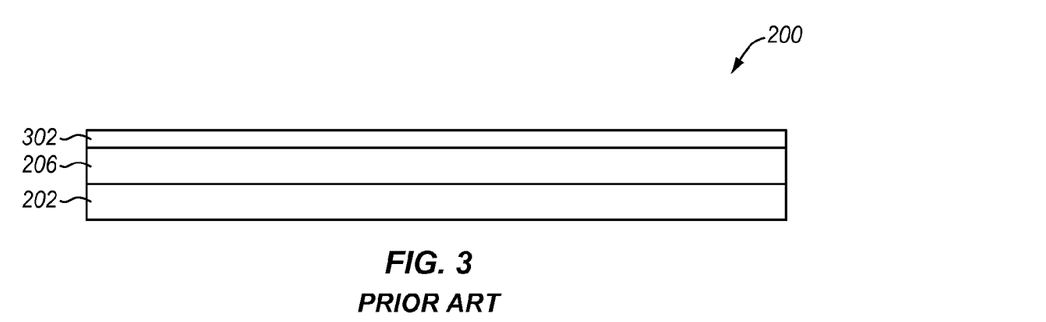
Figure 4:
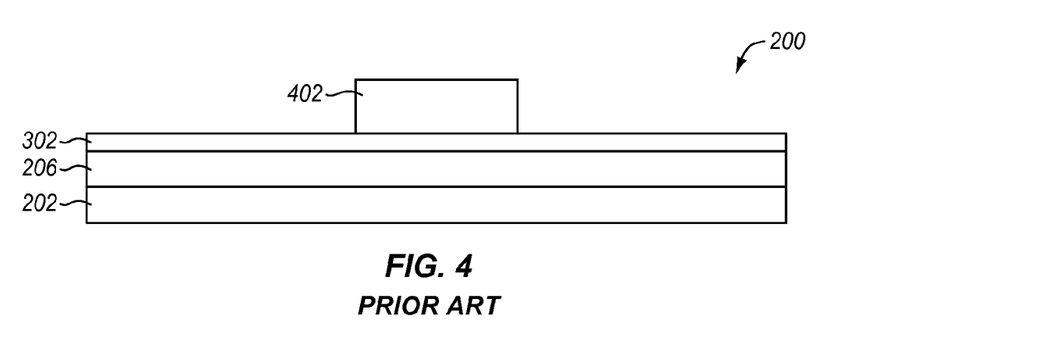
Figure 5:
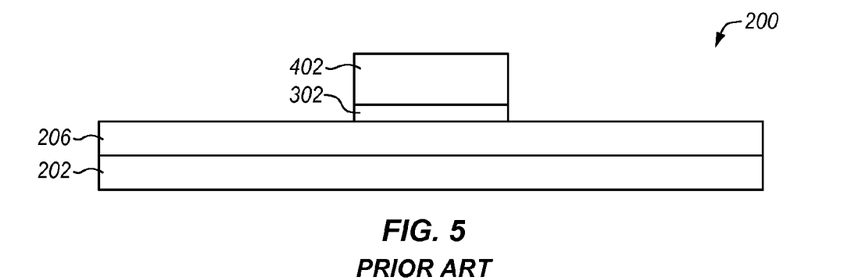

In step 102 of FIG. 1, sensor layers 206 are deposited on shield layer 202 (see FIG. 2). In step 104, a first diamond like carbon (DLC) protective layer 302 is deposited on the sensor layers 206 (see FIG. 3). In step 106, a masking layer 402 is deposited over the first DLC protective layer 302. In step 108, masking layer 402 is etched in a photolithographic process to form a mask structure 402 (see FIG. 4). FIG. 4 illustrates a sensor pattern mask structure 402. Those of ordinary skill in the art will recognize that mask structure 402 may also be formed in the field.

Figure 6:
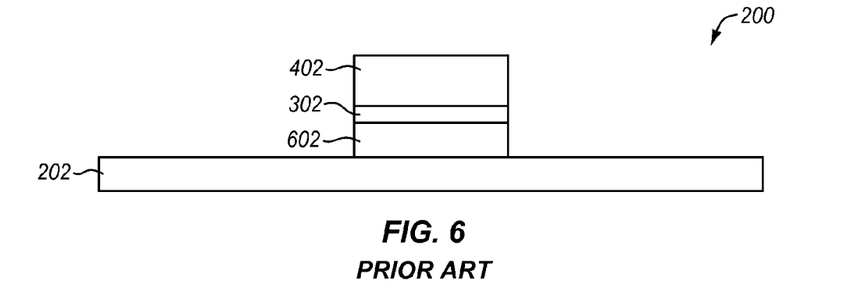

In step 110, the first DLC protective layer 302 is etched using a reactive ion etching (RIE) process. Any exposed areas of the first DLC protective layer 302 not protected by mask structure 402 are removed by exposure to the RIE process (see FIG. 5). In step 112, sensor layers 206 are etched using an ion milling process to define read sensor 602 with desired dimensions as illustrated in FIG. 6.

Figure 7:
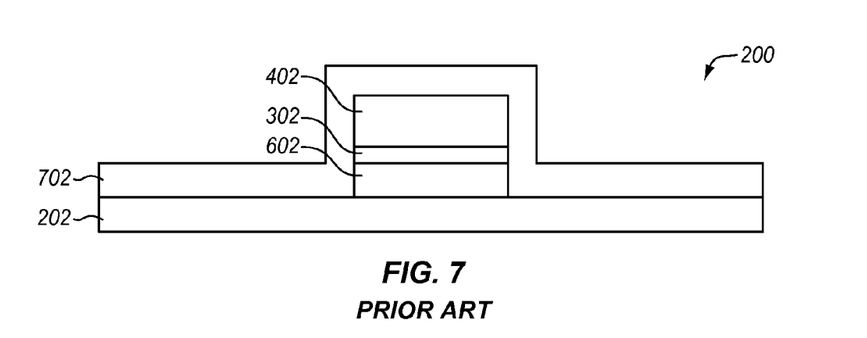
Figure 8:
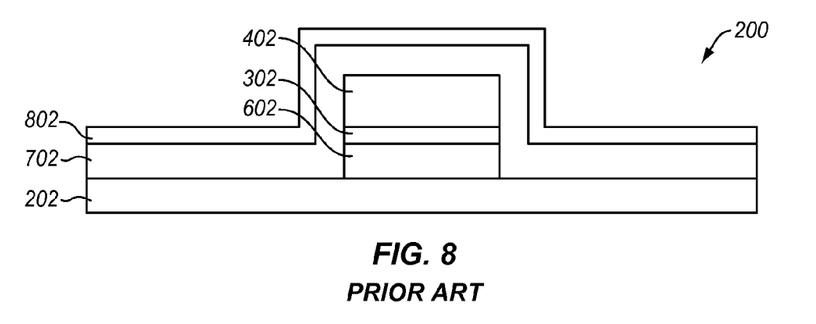
Figure 9:
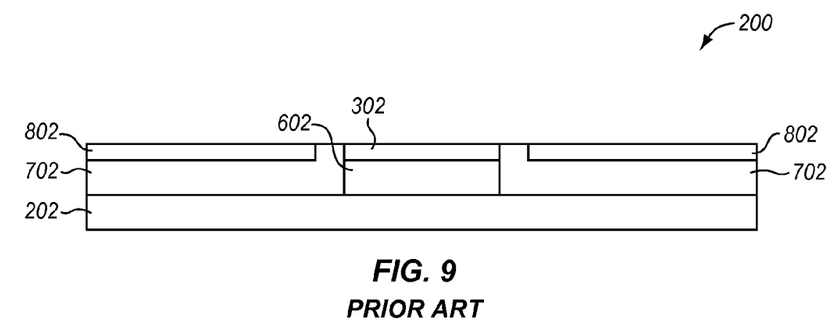

In step 114, an insulator layer 702 is deposited over read sensor 602, as illustrated in FIG. 7. In step 116, a second DLC protective layer 802 is deposited over insulator layer 702 as a stop layer for a CMP lift-off process (see FIG. 8). In step 118, a CMP lift-off process is performed down to the stop layer. The CMP lift-off process removes mask structure 402 and material deposited above mask structure 402, such as overfill insulator material 702. The resulting structure is illustrated in FIG. 9.

Figure 10:
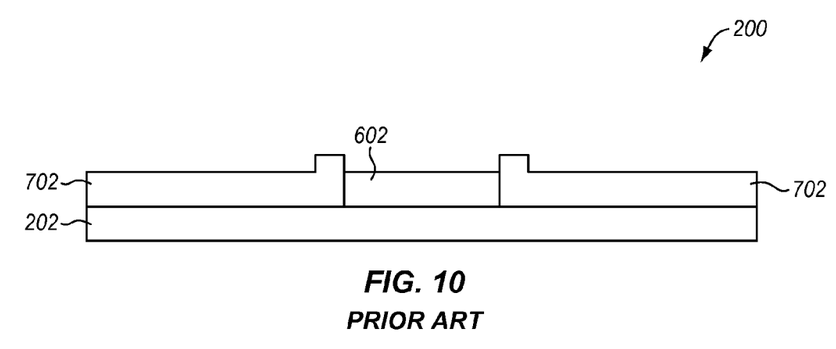

In step 120, a second RIE process is used to remove first DLC protective layer 302 and second DLC protective layer 802. The resulting structure is illustrated in FIG. 10. The prior art process described in FIG. 1 typically encounters fencing or alumina bumps at edges of read sensor 602 fabricated by the stripe height definition process. This added topography may cause shield shorts and sensor shunts subsequent to the track width definition process because insulator layer 702 is not fabricated flush with read sensor 602.

FIGS. 11-25 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

As described in FIG. 1, the typical fabrication process for magnetic readers involves depositing various layers of a magnetic reader on a wafer substrate. Two such layers are a first and second DLC protective layer, which act as stop layers during CMP lift-off. Such protective layers are typically removed before the fabrication process is completed. An exemplary embodiment of the invention eliminates the need for a second protective layer and uses only one protective layer. A patterned and conductive protective layer forms part of the sensor cap of the read sensor. The insulator layer is polished using a CMP process to achieve a flat reader gap. Thus, the exemplary embodiment eliminates the need for deposition of an entire layer in the fabrication process, which thereby also eliminates many of the negative byproducts of such deposition and removal, such as fencing and alumina bumps.

Figure 11:
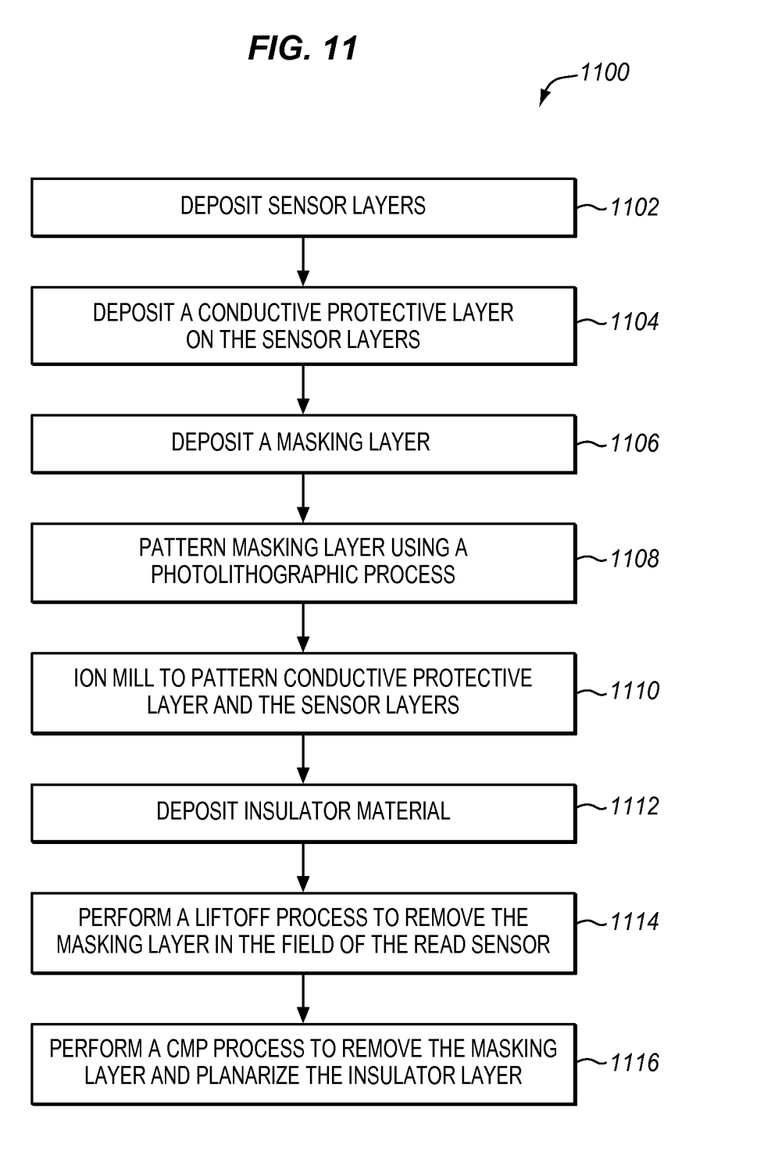
FIG. 11 is a flow chart illustrating an exemplary method for fabricating a magnetic reader using a CMP process for sensor stripe height patterning.

FIG. 11 is a flow chart illustrating a method 1100 for fabricating magnetic readers in an exemplary embodiment of the invention. Method 1100 will be described in reference to magnetic reader 1200 in FIGS. 12-17. The steps of the flow chart in FIG. 11 are not all inclusive and may include other steps not shown. Fabrication of magnetic readers is commonly performed at the wafer level, and those skilled in the art understand that wafer level fabrication is assumed even if the description and drawings refer to a single magnetic reader.

In step 1102, sensor layers 206 (see FIG. 12) for a magnetic reader 1200 are deposited on a shield layer 202. The sensor layers may be deposited during a stripe height definition process defining the stripe height of a read sensor of magnetic reader 1200.

In step 1104, a conductive protective layer 1202 (see FIG. 12) is deposited on sensor layers 206. Conductive protective layer 1202 acts as a stop layer during a later CMP process, and forms the sensor cap of magnetic reader 1200. Conductive protective layer 1202 may be any suitable conductive material, such as Rhodium (Rh). Rh has a CMP material removal rate (2 Angstroms/min) that is comparable to DLC (2 Angstroms/min). The removal rate of Rh is significantly lower than other materials used in magnetic reader fabrication (e.g., Ru (60 A/min), Cr (70 A/min), Ta (1200 A/min) and $Al_2O_3$ (3000 A/min)).

In step 1106, a masking layer 402 is deposited on conductive protective layer 1202. Masking layer 402 is a photo resistive layer used to define the stripe height or track width of a read sensor of magnetic reader 1200. Masking layer 402 may be made of Duramide®, a registered trademark of Cambrex Bio Science Rockland, Inc.

Figure 12:
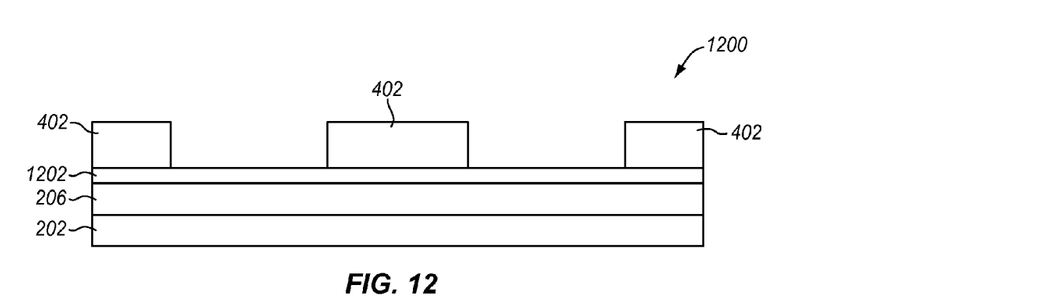
FIGS. 12-16 are cross-sectional views of a magnetic reader formed according to the method of FIG. 11.

In step 1108, a mask structure 402 is formed from masking layer 402. To form mask structure 402, masking layer 402 is light exposed in a pattern to remove desired regions of masking layer 402. If masking layer 402 is a positive photo resist, then masking layer 402 is light-exposed in regions to be removed. Otherwise, if masking layer 402 is a negative photo resist, then masking layer 402 is light-exposed in regions to be retained. The resulting structure of magnetic reader 1200 is illustrated in FIG. 12.

Figure 13:
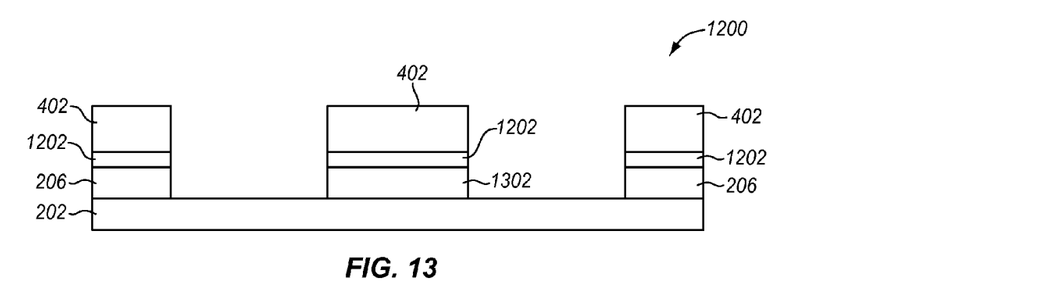

In step 1110, conductive protective layer 1202 is etched through mask structure 402 using an ion milling process to pattern sensor layers 206 and conductive protective layer 1202. The ion milling process defines a read sensor 1302 of magnetic reader 1200 (see FIG. 13). The defined read sensor 1302 is produced by removing portions of sensor layers 206 through the ion milling process. The etching process may define the stripe height of read sensor 1302. Read sensor 1302 has a field on side regions of read sensor 1302. The resulting structure of magnetic reader 1200 is illustrated in FIG. 13.

Figure 14:
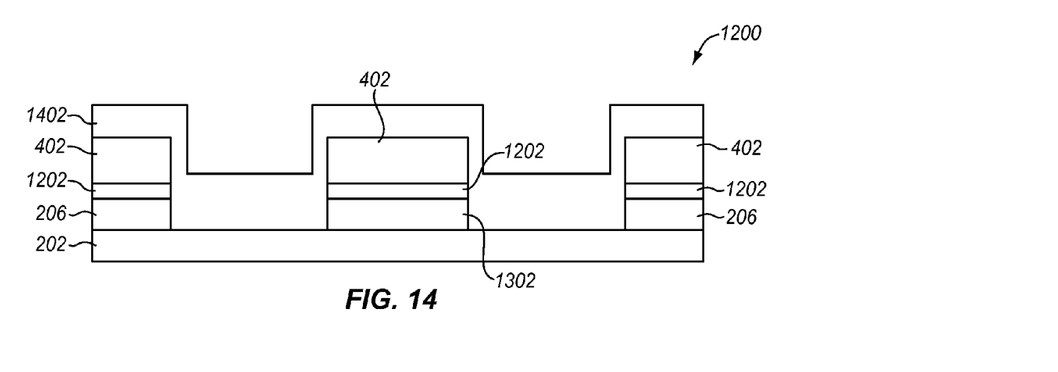

In step 1112, an insulator layer 1402 is deposited on read sensor 1302 (see FIG. 14). Insulator layer 1402 is deposited on side regions (i.e., in the field) of read sensor 1302 to a height above conductive protective layer 1202 (i.e., on read sensor 1302). The overfill portion of insulator layer 1402 above read sensor 1302 may then be removed during the CMP process.

Figure 15:
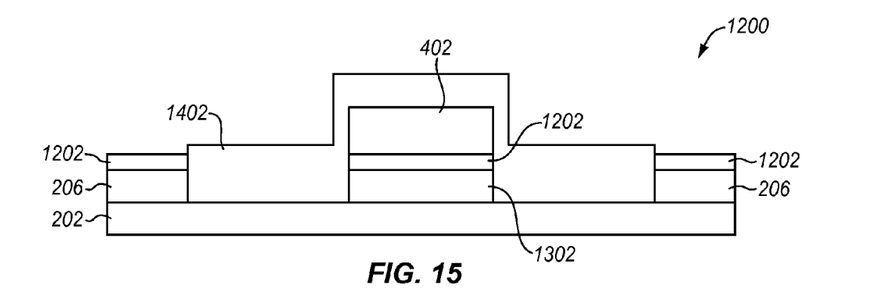
Figure 16:
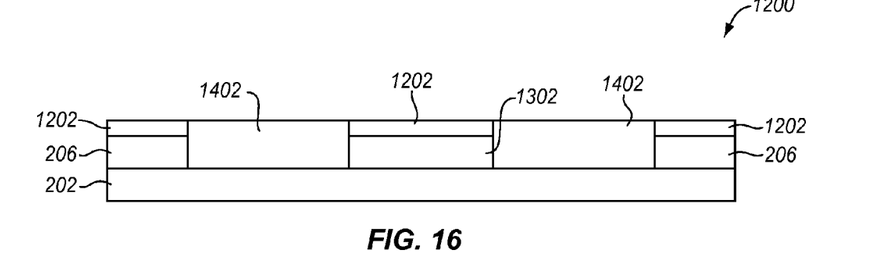

In step 1114, a lift-off process is performed down to conductive protective layer 1202 to remove mask structure 402 on side regions of read sensor 1302. Any material above mask structure 402 in the field of read sensor 1302, such as an overfill portion of insulator layer 1402 is removed with mask structure 402. The resulting structure of magnetic sensor 1200 is illustrated in FIG. 15.

In step 1116, a CMP process is performed to remove masking layer 402 (i.e., sensor pattern mask structure 402) above read sensor 1302. The CMP process planarizes insulator layer 1402 with conductive protective layer 1202. Overfill portions of insulator layer 1402 (see FIG. 15) at a height above conductive protective layer 1202 are polished and removed. Once the CMP process stops at conductive protective layer 1202, insulator layer 1402 will be planarized, as exemplified in FIG. 16. Insulator layer 1302 is thus fabricated flush with read sensor 1302 to achieve a flat reader gap. Conductive protective layer 1202 remains above read sensor 1302 and sensor layers 206 in the field area (i.e., on side regions of read sensor 1302).

Figure 17:
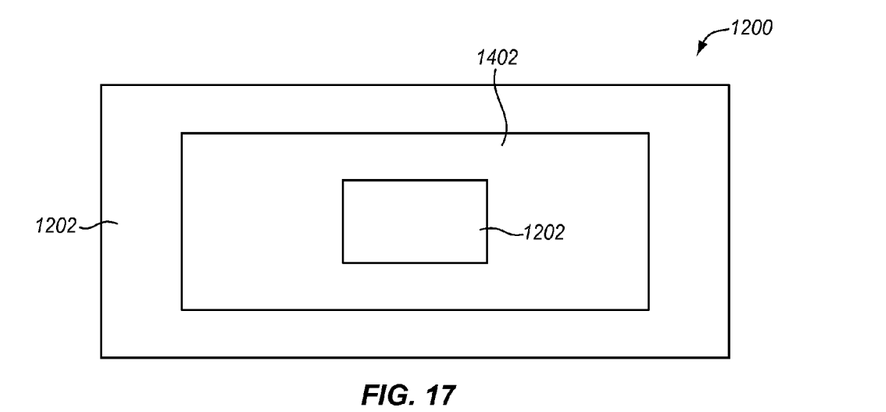
FIG. 17 is a top view of a magnetic reader formed according to the method of FIG. 11.

FIG. 17 illustrates a top view of magnetic reader 1200. Read sensor 1302 is below protective layer 1202 in the center portion of magnetic reader 1200. Sensor layers 206 are below conductive protective layer 1202 in the outer portion of magnetic reader 1200. Sensor layers 206 may be removed during the subsequent fabrication process and the resulting gap may be filled with insulator material to fabricate magnetic reader 1200 with a flat reader gap. Additionally, a track width of read sensor 1302 may be defined to complete the fabrication of read sensor 1302.

Figure 18:
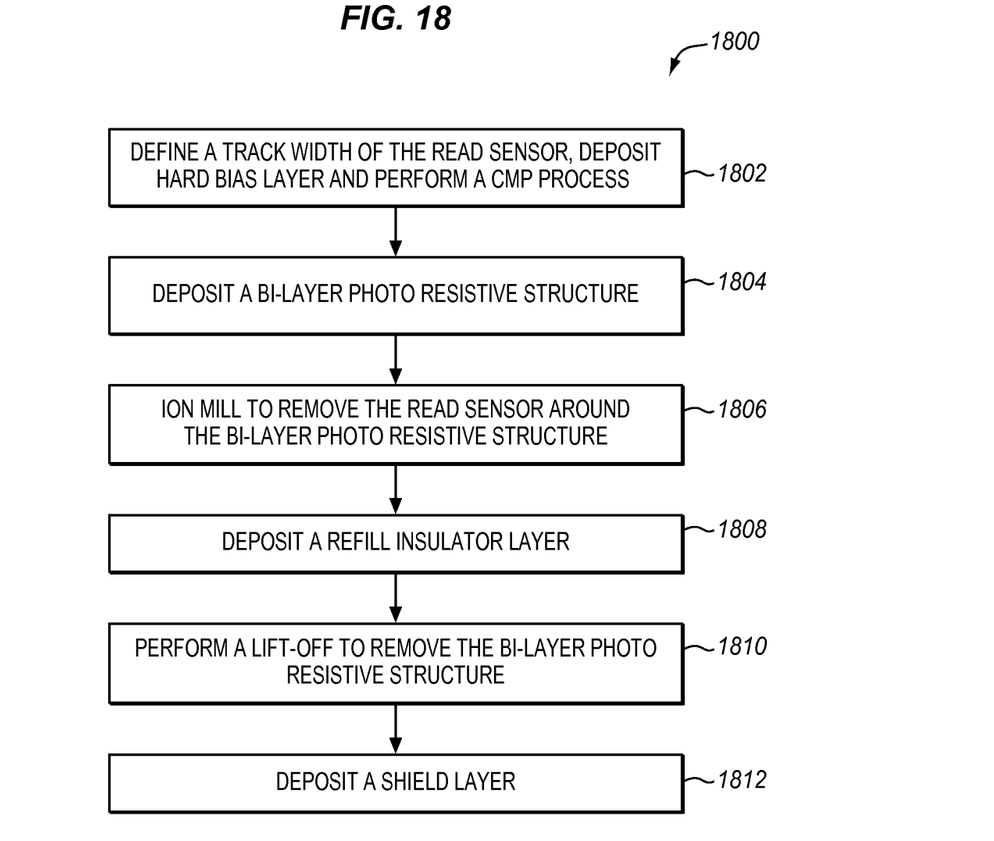
FIG. 18 is a flow chart illustrating an exemplary method for fabricating a magnetic reader.

FIG. 18 is a flow chart illustrating a method 1800 for fabricating magnetic readers in an exemplary embodiment of the invention. Method 1800 will be described in reference to magnetic reader 1200 in FIGS. 12-17 and 19-25. The steps of the flow chart in FIG. 18 are not all-inclusive and may include other steps not shown.

Figure 19:
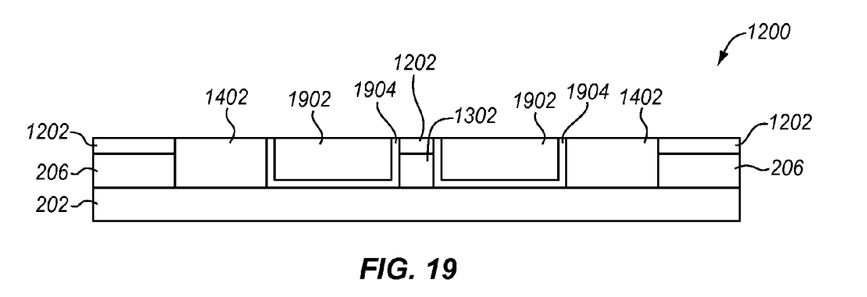
FIGS. 19-24 are cross-sectional views of a magnetic reader formed according to the method of FIG. 18.

In step 1802, read sensor 1302 is etched to define a track width of read sensor 1302. Defining a track width of read sensor 1302 may involve depositing a masking layer over magnetic reader 1200 (i.e., over conductive protective layer 1202) to form a mask structure, ion milling protective layer 1202 and read sensor 1302 to define the track width of read sensor 1302, depositing an insulator layer 1904 and a hard bias layer 1902, and then removing the mask structure. FIG. 19 illustrates magnetic reader 1200 after completion of the track width definition process.

Figure 20:
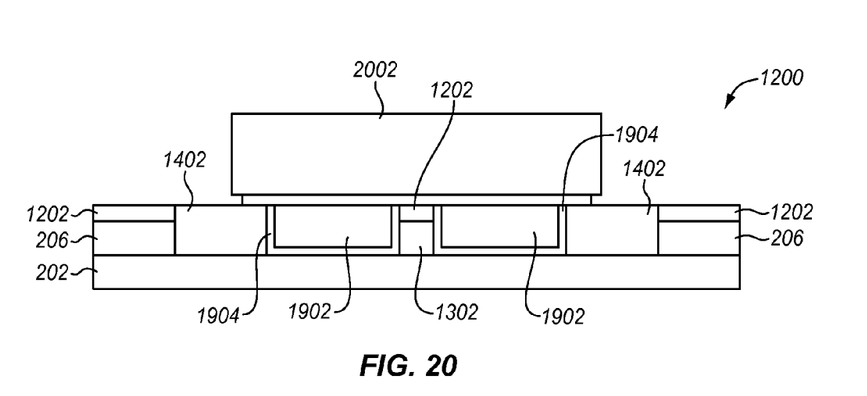
Figure 21:
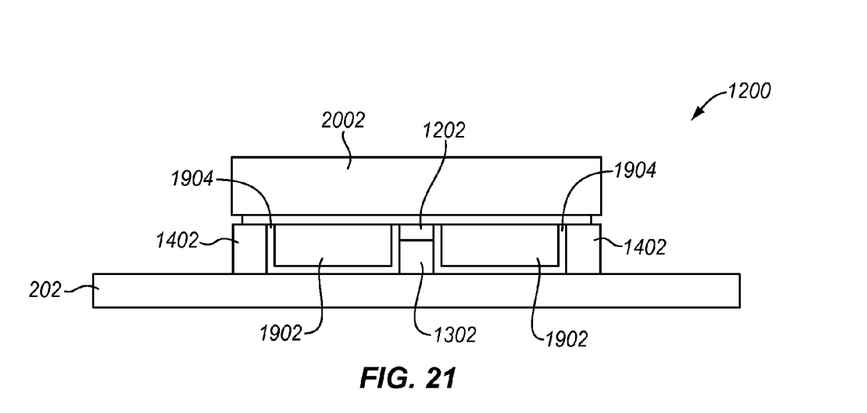

In step 1804, a bi-layer photo resistive structure 2002 is deposited on magnetic reader 1200. The resulting structure of magnetic reader 1200 is illustrated in FIG. 20. In step 1806, an ion milling process is performed on read sensor 1200 around bi-layer photo resistive structure 2002 to remove sensor layers 206 and conductive protective layer 1202 in the field (i.e., on side regions) of read sensor 1302. The resulting structure of magnetic reader 1200 is illustrated in FIG. 21.

Figure 22:
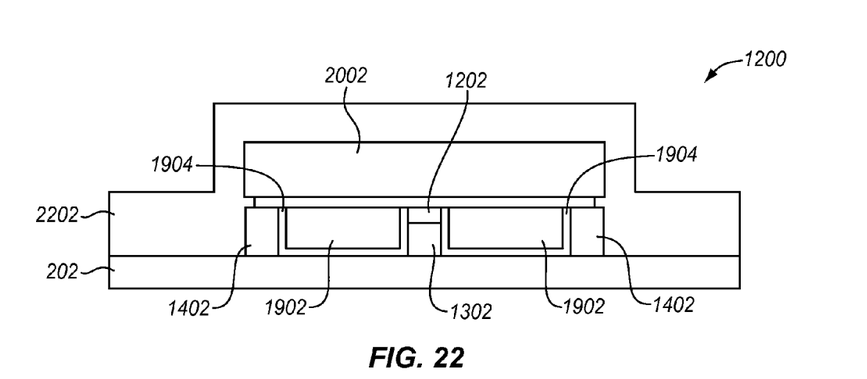

In step 1808, a refill insulator layer 2202 is deposited on magnetic reader 1200. Refill insulator layer 2202 may be Alumina ($Al_2O_3$), and may be deposited to a height above conductive protective layer 1202. The resulting structure of magnetic reader 1200 is illustrated in FIG. 22.

Figure 23:
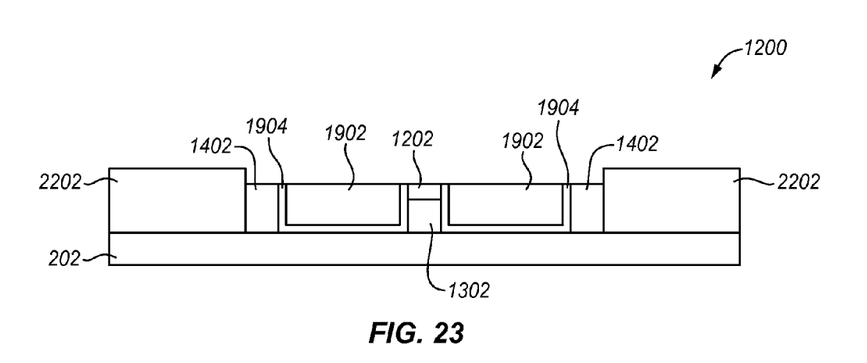
Figure 24:
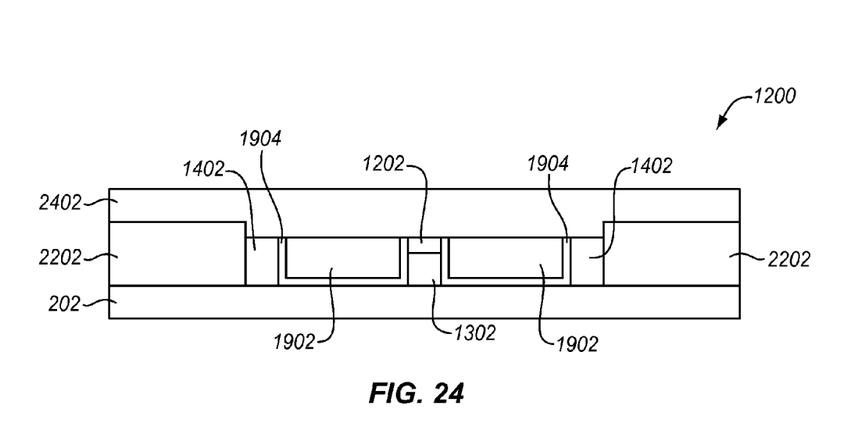
Figure 25:
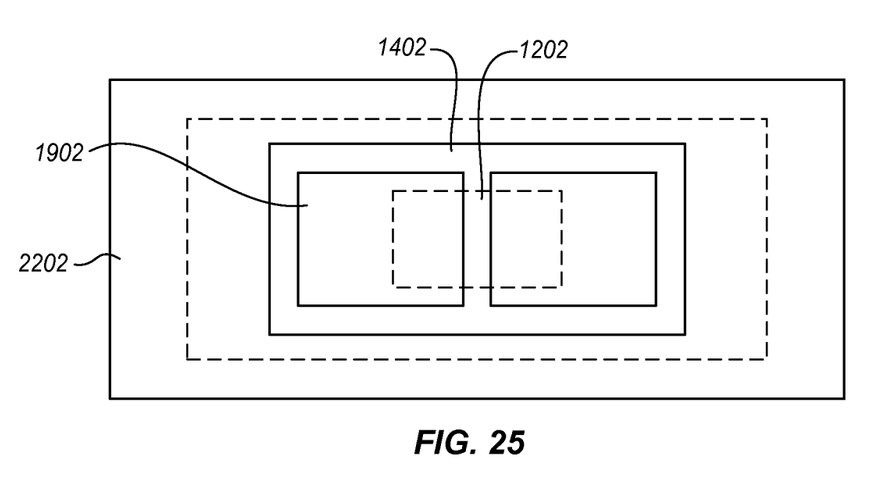
FIG. 25 is a top view of a magnetic reader formed according to the method of FIG. 18.

In step 1810, a lift-off process is performed to remove bi-layer photo resistive structure 2002. The resulting structure of magnetic reader 1200 is illustrated in FIG. 23. In step 1812, a shield layer 2402 may then be deposited on magnetic reader 1200. The resulting structure of magnetic reader 1200 is illustrated in FIG. 24. FIG. 25 illustrates a top view of magnetic sensor 1200 fabricated by method 1800.

Although specific embodiments were described herein, the scope of the invention is not limited to those specific embodiments. The scope of the invention is defined by the following claims and any equivalents therein.

We claim:

1. A method for fabricating magnetic readers, the method comprising:
    depositing sensor layers;
    depositing a conductive Chemical Mechanical Polishing (CMP) stop layer on the sensor layers;
    patterning the conductive CMP stop layer and the sensor layers to define a read sensor of a magnetic reader, wherein the read sensor has a field on side regions of the read sensor;
    depositing an insulator layer, wherein the insulator layer directly contacts the read sensor and is deposited in the field of the read sensor to a height above the conductive CMP stop layer to form an overfill portion above the conductive CMP stop layer; and
    performing a CMP process down to the conductive CMP stop layer to remove the overfill portion of the insulator layer above the conductive CMP stop layer and to remove a sensor pattern mask structure above the conductive CMP stop layer.

2. The method of claim 1 wherein performing the CMP process comprises:
    polishing the insulator layer to a target thickness of the insulator layer.

3. The method of claim 1 wherein defining the read sensor comprises defining a stripe height of the read sensor.

4. The method of claim 1 wherein the conductive CMP stop layer comprises Rhodium (Rh) and the Rh forms a sensor cap of the read sensor.

5. The method of claim 1, wherein the read sensor has a field on side regions of the read sensor, and the method further comprises:
    performing a lift-off process to remove the sensor pattern mask structure in the field of the read sensor.

6. The method of claim 1 wherein the read sensor has a field on side regions of the read sensor, and the insulator layer is deposited in the field of the read sensor to a height above the conductive CMP stop layer.

7. The method of claim 1 wherein the read sensor has a field on side regions of the read sensor, and the insulator layer is deposited in the field of the read sensor to a height above the read sensor.

8. A method for fabricating magnetic readers, the method comprising:
    patterning a conductive Chemical Mechanical Polishing (CMP) stop layer and sensor layers to define a stripe height of a read sensor of a magnetic reader, wherein the conductive CMP stop layer is formed above a top portion of the read sensor to protect the read sensor, and the read sensor has a field on side regions of the read sensor;

depositing an insulator layer, wherein the insulator layer directly contacts the read sensor and is deposited in the field of the read sensor to a height above the conductive CMP stop layer to form an overfill portion above the conductive CMP stop layer;

performing a CMP process down to the conductive CMP stop layer to remove the overfill portion of the insulator layer above the conductive CMP stop layer and to planarize the insulator layer with the conductive CMP stop layer and to remove a sensor pattern mask structure above the conductive CMP stop layer;

patterning sensor layers to define a track width of the read sensor;

depositing a bi-layer photo resistive structure on the magnetic reader;

milling the magnetic reader to remove material on side regions of the bi-layer photo resistive structure;

depositing insulator material on side regions of the bi-layer photo resistive structure; and performing a lift-off process to remove the bi-layer photo resistive structure.

9. The method of claim 8 wherein the conductive CMP stop layer forms a sensor cap of the read sensor.

10. The method of claim 8 wherein the conductive CMP stop layer comprises Rhodium (Rh), and the Rh forms a sensor cap of the read sensor.

11. The method of claim 8 wherein defining the stripe height of the read sensor comprises:

depositing sensor layers;

depositing the conductive CMP stop layer on the sensor layers;

depositing a masking layer on the conductive CMP stop layer, wherein the masking layer is etchable for definition of the sensor pattern mask structure and a field pattern mask structure;

etching the conductive CMP stop layer around the sensor pattern mask structure and the field pattern mask structure to remove a portion of the conductive CMP stop layer; and etching the sensor layers to define the read sensor.

12. The method of claim 11 further comprising:

performing a lift-off process to remove the field pattern mask structure in the field of the read sensor.

13. A method for fabricating magnetic readers, the method comprising:

depositing sensor layers;

depositing a conductive Chemical Mechanical Polishing (CMP) stop layer on the sensor layers;

depositing a masking layer on the conductive CMP stop layer, wherein the masking layer is etchable for definition of a mask structure;

etching the conductive CMP stop layer around the mask structure to remove a portion of the conductive CMP stop layer;

etching the sensor layers around the mask structure to remove a portion of the sensor layers, wherein the etched conductive CMP stop layer and the etched sensor layers define a stripe height of a read sensor of the magnetic reader;

depositing an insulator layer, wherein the insulating layer directly contacts the read sensor and is deposited to a height above the conductive CMP stop layer to form an overfill portion above the conductive CMP stop layer; and performing a CMP process down to the conductive CMP stop layer to remove the overfill portion of the insulator layer above the conductive CMP stop layer and to remove a sensor pattern mask structure above the conductive CMP stop layer.

14. The method of claim 13 wherein performing the CMP process further comprises:

polishing the insulator layer to a target thickness of the insulator layer; and lifting off the sensor pattern masking structure above the protective layer.

15. The method of claim 13 further comprising:

patterning sensor layers to define a track width of the read sensor;

depositing a bi-layer photo resistive structure on the magnetic reader;

milling the magnetic reader to remove material on side regions of the bi-layer photo resistive structure;

depositing insulator material on side regions of the bi-layer photo resistive structure; and performing a lift-off process to remove the bi-layer photo resistive structure.

16. The method of claim 13 wherein the conductive CMP stop layer forms a sensor cap of the read sensor.

17. The method of claim 13 wherein the conductive CMP stop layer comprises Rhodium (Rh), and the Rh forms a sensor cap of the read sensor.

18. The method of claim 13, wherein the read sensor has a field on side regions of the read sensor, and the method further comprises:

performing a lift-off process to remove the mask structure in the field of the read sensor.

19. The method of claim 13 wherein the read sensor has a field on side regions of the read sensor, and the insulator layer is deposited in the field of the read sensor to a height above the CMP stop layer.

20. The method of claim 13 wherein the read sensor has a field on side regions of the read sensor, and the insulator layer is deposited in the field of the read sensor to a height above the read sensor.

* * * * *